US006362917B1

(12) United States Patent
Cordina et al.

(10) Patent No.: US 6,362,917 B1
(45) Date of Patent: Mar. 26, 2002

(54) OPTICAL AMPLIFIER

(75) Inventors: Kevin J Cordina, Whittle le Woods; Nigel Jolley, Honeybourne, both of (GB)

(73) Assignee: Nortel Networks Corporation, St. Laurent (CA)

( * ) Notice: Subject to any disclaimer, the term of this patent is extended or adjusted under 35 U.S.C. 154(b) by 0 days.

(21) Appl. No.: 09/480,509

(22) Filed: Jan. 10, 2000

(51) Int. Cl.$^7$ ................................................ H01S 3/00
(52) U.S. Cl. ................................. 359/337.1; 359/341.1
(58) Field of Search .............................. 359/341, 337, 359/337.1, 341.1

(56) References Cited

U.S. PATENT DOCUMENTS 5,636,301 A * 6/1997 O'Sullivan et al. ........... 385/24

* cited by examiner

*Primary Examiner*—Mark Hellner
(74) *Attorney, Agent, or Firm*—Lee, Mann, Smith, McWilliams, Sweeney & Ohlson

(57) ABSTRACT

An optical amplifier comprises an erbium doped optical fiber (2) and a plurality of optical filtration elements (12) provided at respective positions along the fiber. The wavelength response of each of the optical filtration elements (12) is selected in dependence on the gain response of the optical fiber at the respective position along the fiber, thereby flattening the gain of the amplifier with respect to wavelength over a predetermined bandwidth. This bandwidth may include both the C and L bands.

17 Claims, 6 Drawing Sheets

OPTICAL AMPLIFIER

FIELD OF THE INVENTION

This invention relates to an optical amplifier for an optical communications system, and in particular a broadband optical amplifier, for example for use within WDM (wavelength division multiplexing) systems.

BACKGROUND OF THE INVENTION

To support the ever increasing demand for bandwidth in WDM systems, broadband optical amplifiers are required for use in such optical communications applications. Erbium Doped Fiber Amplifiers (EDFAs) are commonly used in these applications. Although EDFAs can have excellent characteristics over certain wavelength bands, the available spectral band width is limited. The amplification band of an EDFA results from the radiative decay of excited electrons within the Er atoms and since not all energy level transitions are equally likely, input light at a wavelength corresponding to the most likely energy level transition experiences a higher gain than input light at other wavelengths. This creates a non-flat gain profile of the amplifier, known as gain ripple, which is a well known problem.

One proposed way of obtaining optical amplification over a broad bandwidth is achieved by providing amplification in two discreet wavelength bands, the Conventional (C) band of approximately 1528 nm to 1563 nm and the Long (L) band of approximately 1570 nm to 1605 nm. The amplifiers for the two bands are configured differently, for example using different lengths of doped fiber. This requires input signals to the amplifier to be split into the two bands, amplified separately and then recombined at an output of the amplifier. This is difficult since wavelength-dependent demultiplexing hardware is required to split the input signals, two separate amplifiers are needed for the respective demulitplexed bands (C and L) and then multiplexing hardware is needed to recombine the separately amplified signals. This configuration is therefore expensive and introduces a noise penalty to the amplified signal and also introduces additional loss which must be compensated for by extra gain in the amplifier.

It is not possible at present to use a single Er doped fiber as a broadband optical amplifier as the gain ripple problem described above is exacerbated as the bandwidth increases. Over a bandwidth of, say, 1530 nm to 1610 nm a gain ripple of over 30 dB is common. The ripple can be removed with a discrete filter such as a single filter positioned at the amplifier output, but this wastes power thereby reducing the efficiency of the amplifier and making the amplifier impractical.

A further problem with such amplifiers is the propagation and amplification of spontaneous emission noise leading to Amplified Spontaneous Emission (ASE). Spontaneous emission occurs throughout the length of the Er fiber. Thus, spontaneous emission at either end of the amplifier experiences the full gain of the amplifier in either the forwards or backwards direction. Once this ASE reaches the opposite end of the amplifier its power can be significant. The backwards propagating ASE has the largest effect as the signal power at the input of the amplifier is small and is thus easily dominated by the ASE as opposed to the signal thereby reducing the amplifier efficiency and causing poor noise performance. Similarly, if any one channel power is significantly larger than the others, the same problems occur.

SUMMARY OF THE INVENTION

According to the present invention, there is provided an optical amplifier comprising an Erbium doped optical fiber and a plurality of optical filtration elements provided at respective positions along the fiber, wherein the wavelength response of each of the optical filtration elements is selected to correspond to a parameter of the optical fiber at the respective position along the fiber, thereby flattening the gain of the amplifier with respect to wavelength over a predetermined bandwidth.

The invention provides an EDFA having a plurality of optical filtration elements provided at respective positions along the fiber having wavelength responses tuned, for example, to the gain profile of the Er doped fiber at that point. Each optical filtration element can then be tuned to the wavelength which corresponds to a peak in the gain profile of the amplifier at that point, which would ordinarily provide unacceptable level of gain of the ASE. Thus, over the entire length of the Er fiber the gain experienced by a propagating signal can be maintained substantially flat with respect to wavelength.

Preferably, the optical filtration elements are non reflective gratings formed in the erbium doped fiber.

Alternatively, the optical filtration elements are optical filters such as tapered fiber filters spliced into the erbium doped optical fiber. Filtration elements are commonly lossy components and thus, amplifier gain must be increased. However the use of tapered fiber filters reduces this effect due to their low background loss.

Preferably, the parameter of the optical fiber is the gain profile with respect to wavelength of the optical amplifier at that position along the optical fiber.

More preferably, the wavelength response of each of the optical filtration elements is selected to have a maximum loss at a wavelength corresponding to a maximum value of the gain profile of the erbium doped optical fiber at that position.

Preferably, the optical amplifier has a gain ripple of less than 3 dB over a wavelength range extending between 1530 nm and 1610 nm. The gain ripple may be less than 1 dB, and may even be as low a 0.1 dB to enable the amplifier to be used within a WDM system.

The use of the optical filtration elements arranged as described above enables a length of Er fiber to be used in the amplifier which can provide amplification of optical signals over a broad bandwidth. Furthermore, whereas in conventional broadband optical amplifiers there is a region of bandwidth (between the C and L bands) which is not usable, in the present invention a continuous band may be used.

Preferably, the length of the erbium doped fiber is greater than 20 m and more preferably, the length is between 25 m and 35 m.

The invention also provides a communications system having an optical fiber coupled between a first and second endstation, and a number of optical amplifiers of the invention connected to the optical fiber at positions along the fiber.

According to a second aspect of the present invention, there is provided an optical amplifier comprising an erbium doped optical fiber and a plurality of optical filtration elements provided at respective positions along the fiber, the fiber having a length of between 25 m and 35 m, and having at least five optical filtration elements along the length of the fiber, thereby giving the amplifier a gain ripple of less than 3 dB over a wavelength range extending between 1530 nm and 1590 nm.

Preferably, there are at least ten optical filtration elements.

The use of a large number of filters increases the efficiency of the amplifier. The filters have the effect of limiting the ASE and stopping its growth which would otherwise be exponential. This ensures that less power is wasted overall and increases the efficiency of the amplifier.

BRIEF DESCRIPTION OF THE DRAWINGS

Examples of the present invention will now be described in detail with reference to the accompanying drawings, in which.

DETAILED DESCRIPTION

Figure 1:
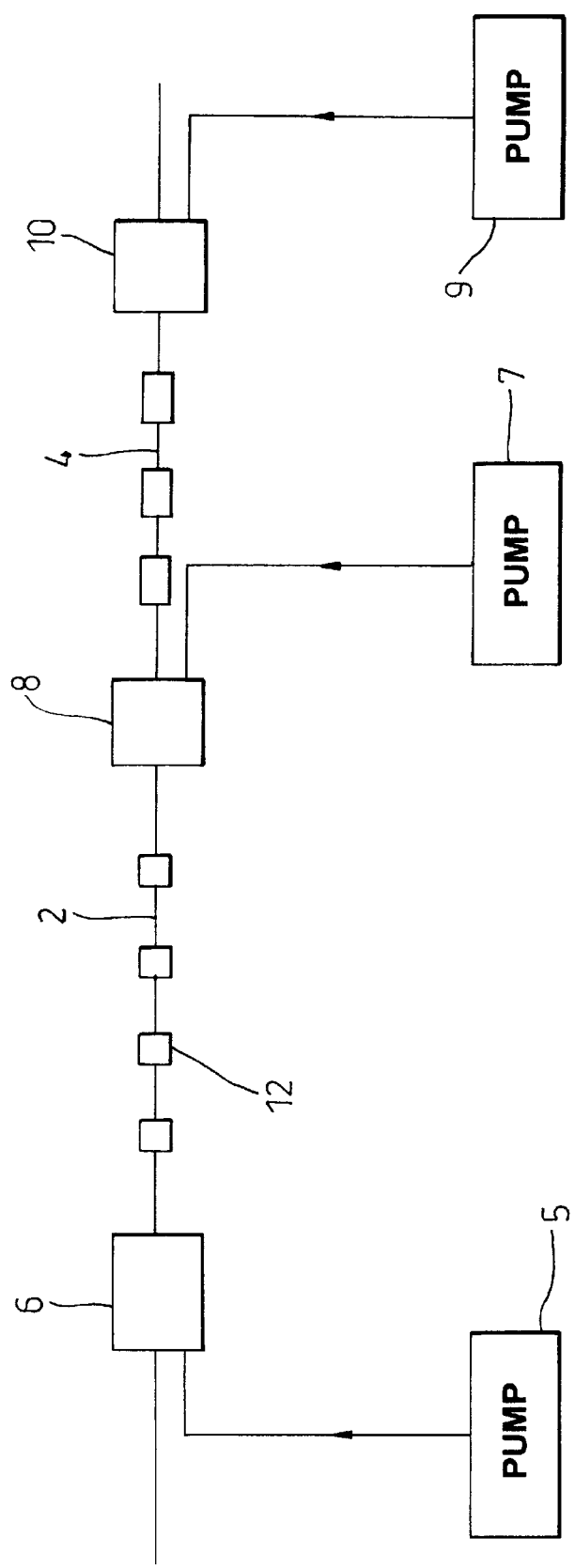
FIG. 1 shows an example of an optical amplifier according to the present invention.

FIG. 1 shows an example of an optical amplifier according to the present invention. The amplifier has a first erbium doped fiber 2 and a second Erbium doped fiber 4 connected in series. In this example, first pump source 5 is arranged to co-pump the first Erbium doped fiber 2 via coupler 6 at a wavelength of 980 nm. Second and third pump sources 7, 9 are arranged to counter-pump the first and second erbium doped fibers 2 and 4 respectively via couplers 8 and 10 at a wavelength of 1480 nm or 980 nm. A plurality of optical filtration elements 12 are provided along the length of the first erbium doped fiber 2. Of course, optical filtration elements could also be provided along the length of the second Erbium doped fiber 4, or any subsequent stages of the amplifier (such as a high gain stage used to boost the amplifier output).

Figure 2:
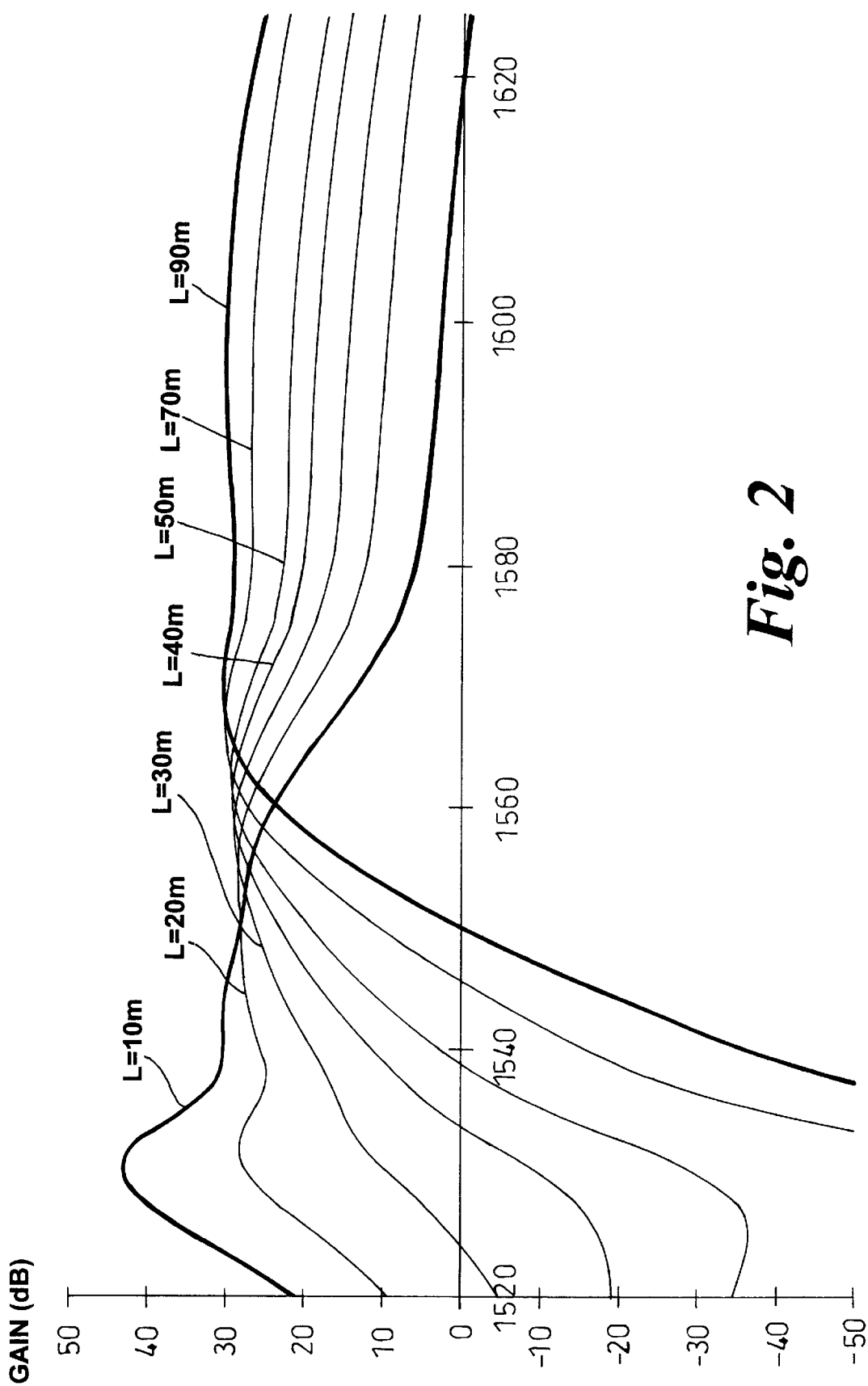
FIG. 2 shows a series of plots showing the variation of the gain profile of an erbium doped fiber amplifier with length of erbium doped fiber.

FIG. 2 shows a series of plots showing the variation of the gain profile of an EDFA with length. It is clear that as the length of the doped fiber increases, the gain profile maximum shifts to an increased wavelength. For example, the gain profile for a 10 m EDFA has a maximum at approximately 1530 nm but this is increased to 1560 nm for a 40 m EDFA. The optical filtration elements are selected to have a loss profile matching the gain profile of the optical fiber at the respective position along the fiber. For example, for an EDFA of length 25 m, the optical filtration element at a position near the input of the fiber will be selected to have a maximum loss for wavelengths equal to around 1525 nm and the optical filtration element at a position near the output of the fiber will be selected to have a maximum loss for wavelengths around 1550 nm. The amplifier gain characteristics at each point along its length contributes to the overall gain response of the amplifier. By introducing optical filters along the length of the fiber, thereby changing the gain characteristics at points along its length, the overall effect on the amplifier is one of gain flattening over the entire bandwidth from 1520 nm to 1610 nm. Without filtering elements, a high gain at a certain wavelength will cause pump light to be absorbed. This reduces the power available to other wavelengths. By preventing any one wavelength region becoming significantly more powerful than others, the overall efficiency and gain profile is improved.

This arrangement of optical filtration elements is particularly useful for removing unwanted backwards propagating ASE. Backwards propagating ASE which is generated near the input of the amplifier does not travel a large distance, and therefore does not substantially affect the operation of the amplifier. However, ASE that starts close to the output of the amplifier can cause substantial deterioration of the amplifier performance. This is because near the input of the amplifier, the level of backwards propagating ASE is substantial compared to that of the desired signal since the ASE has travelled along most of the length of the amplifier and thus experiences the same gain as forward propagating signals. This can therefore cause depletion of the inversion level of the amplifier and can lead to a waste of pump power, reducing the efficiency and increasing the noise figure of the amplifier.

Figure 3:
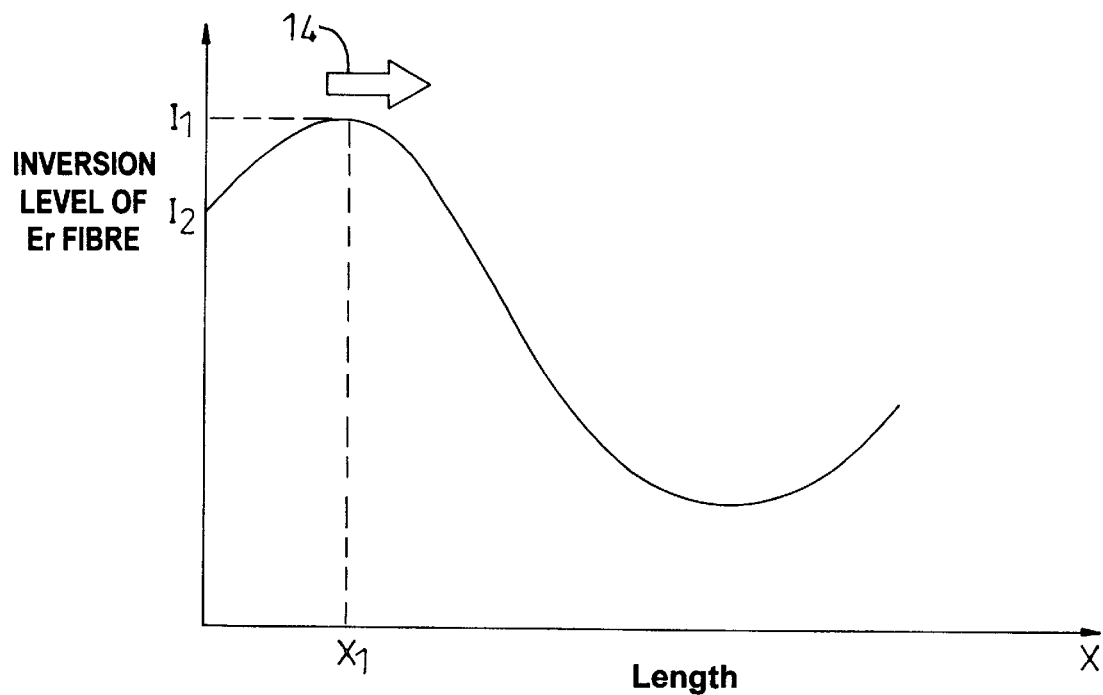
FIG. 3 shows a graph of inversion level against displacement along the Er fiber.

This can be seen from FIG. 3 which shows a graph of inversion level against displacement along the Er fiber. The inversion level has a maximum value near the input of the amplifier as the pump source is located in this region. The depletion of the inversion level (i.e. the difference between $I_1$ and $I_2$) is caused by the backwards propagating ASE. As will be described below, the use of an optical isolator located at a position on the optical fiber corresponding to this maximum value can limit the depletive effect of the ASE.

By selecting the optical filtration elements in dependence on their wavelength responses and positioning them at selected positions along the optical fiber to correspond to the gain profile at that position, it is possible to reduce the build up of ASE throughout the system. Furthermore, the use of a large number of filters increases the efficiency of the amplifier. This is because the exponential build up of the ASE is suppressed at successive positions along the fiber and thus the ASE power is maintained at a low level and is prevented from growing exponentially.

Figure 4:
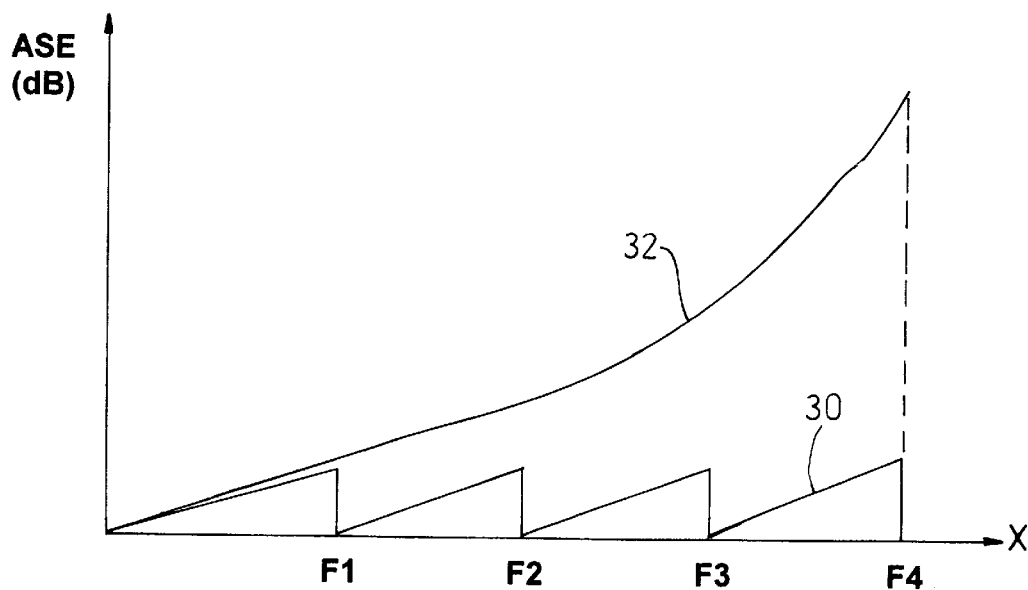
FIG. 4 shows the amplification of ASE for an erbium doped fiber with and without intermediate filters.

FIG. 4 shows the amplification of ASE for an erbium doped fiber with (plot 30) and without (plot 32) intermediate filters.

Figure 5:
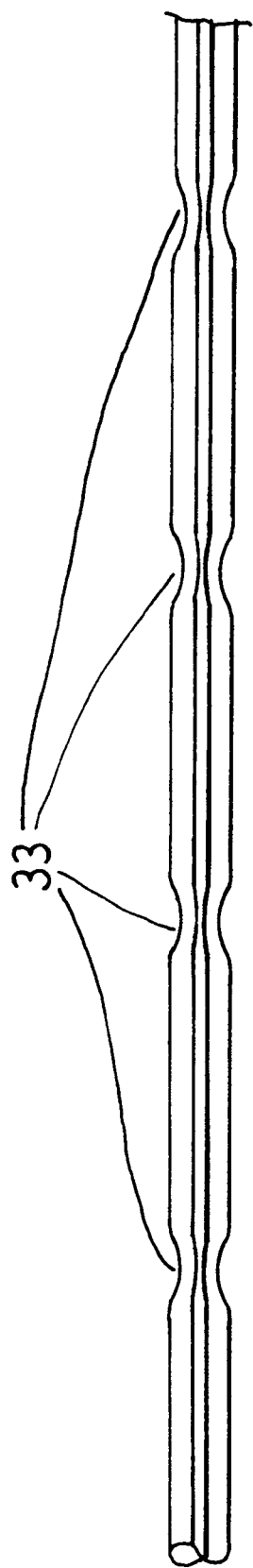
FIG. 5 shows an example of an optical filter suitable for use in the optical amplifier of the present invention.

The optical filtration elements used may be conventional optical filters. For example, tapered fiber filters 33 shown in FIG. 5 which are described in U.S. Pat. No. 5,708,740 may be used. The tapered fiber filter shown in FIG. 5 is an optical notch filter created by using a micro-burner and longitudinal stretching of the fiber to form a set of equi-spaced sharply localised non-adiabatic biconical tapers 3. These filters are particularly suitable for use in this application due to the low background loss they introduce to the amplifier.

It is also possible to use any other form of optical filtration element such as a grating formed in the doped fiber. This grating could be formed using Ge doped photosensitive fiber. Blazed filter technology (as described in U.S. Pat. No. 5,740,292) could be used to prevent reflection from the grating. A pattern of these could be formed to provide a desired wavelength response of the amplifier. Alternatively, dielectric filters would also be suitable for use in this application. Optionally, an adaptive gain flattening filter can be provided at the output of the amplifier to remove any residual gain ripple.

Figure 6:
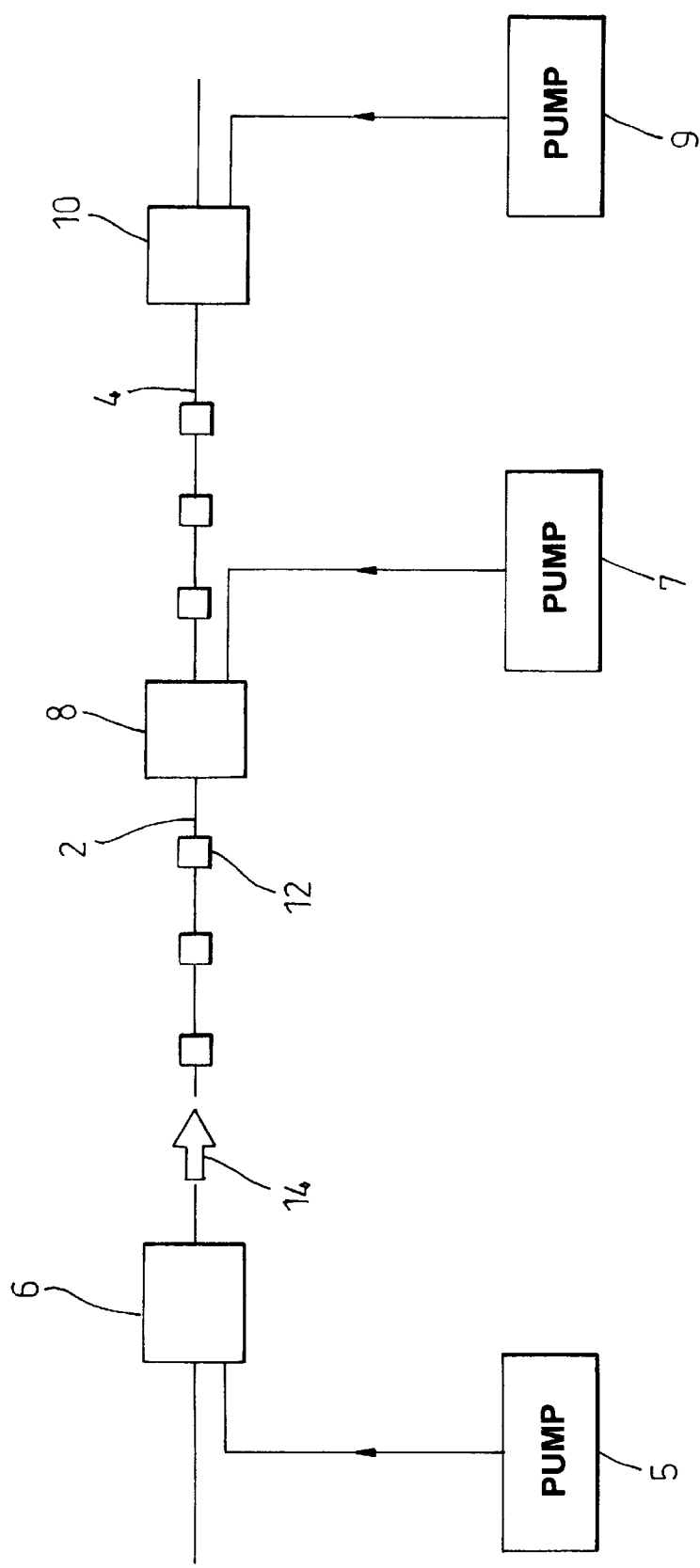
FIG. 6 shows a second example of an optical amplifier according to the present invention.

FIG. 6 shows a second example of an optical amplifier according to the present invention. The same components are included in the amplifier structure as shown and described with reference to FIG. 1, with the addition of an optical isolator 14. The optical isolator 14 is configured to stop the flow of backwards propagating ASE as described above. The graph of inversion level against distance (see FIG. 4) is used to determine the optimum position to locate the isolator. In this case, the isolator is placed at a position along the fiber corresponding to the maximum inversion level. Any ASE which has propagated backwards along the entire length of the fiber would experience maximum gain at this position due to the inversion level being at a maximum. This would therefore lead to the greatest waste in power of the amplifier and hence the isolator is arranged at this position to limit this effect. The majority of the pump power from the counter-pump 7 and the co-pump 5 is absorbed before it reaches the isolator. However, a bypass may be provided to allow the counter pump signal to reach the front end of the EDFA.

Figure 7:
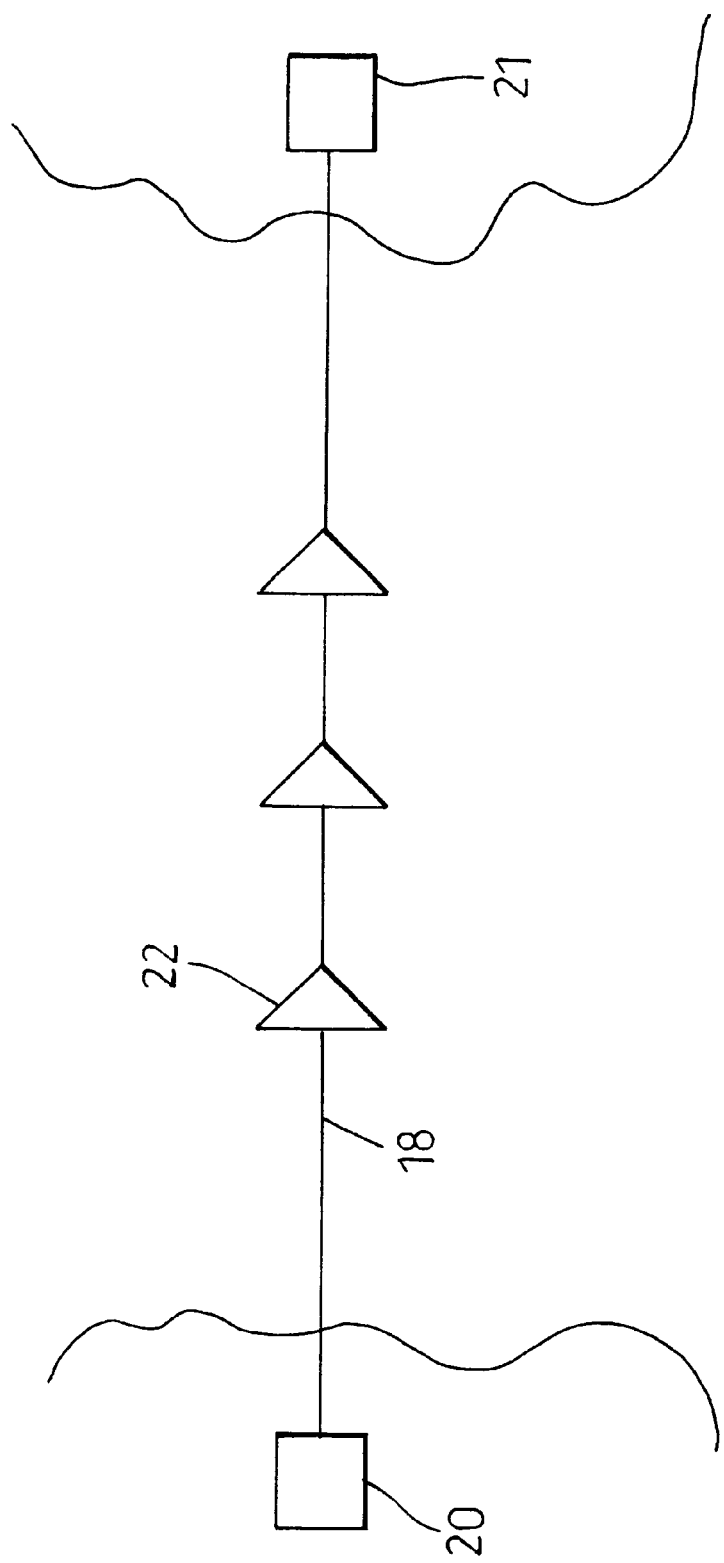
FIG. 7 shows a communications system according to the present invention.

FIG. 7 shows a communications system according to the present invention. The system has an optical cable 18 coupled between first and second line terminal endstations 20 and 21. A plurality of optical amplifiers 22 are provided along the optical cable 18. At least one of the optical amplifiers is an optical amplifier according to the present invention.

The length of the fiber will be selected to achieve the desired gain response and also depends on the dopant level. Typically the length is greater than 20 m, for example 25 m to 35 m. The filters may be arranged regularly spaced or they may be arranged more precisely to achieve the desired effect. Typically, there may be more than 10 filter elements, for example between 12 and 20. An increased number of filters enables more accurate gain control but at the expense of increased loss.

What is claimed is:

1. An optical amplifier comprising a rare earth doped optical fiber and a plurality of optical filtration elements provided at respective positions along the fiber, wherein the wavelength response of each of the optical filtration elements is selected in dependence on the local gain profile of the optical fiber at the respective position along the fiber thereby flattening the gain of the amplifier with respect to wavelength over a predetermined bandwidth.

2. An optical amplifier according to claim 1, in which the optical filtration elements are blazed Bragg gratings formed in the optical fiber.

3. An optical amplifier according to claim 2, in which each optical filtration element comprises a chirped periodicity of the filter element arranged to provide a predetermined wavelength response.

4. An optical amplifier according to claim 1, in which the optical filtration elements are tapered fiber filters spliced into the optical fiber.

5. An optical amplifier according to claim 1, in which the wavelength response of each of the optical filtration elements is selected to have a maximum loss at a wavelength corresponding to a maximum value of the gain profile of the optical fiber at that position.

6. An optical amplifier according to claim 1, further comprising at least one buried optical isolator to limit the flow of backwards propagating ASE generated in the optical amplifier.

7. An optical amplifier according to claim 1, in which the length of the fiber is greater than 20 m.

8. An optical amplifier according to claim 7, in which the length of the fiber is between 25 m and 35 m.

9. An optical amplifier according to claim 1, in which there are at least 10 optical filtration elements provided at respective positions along the fiber.

10. An optical amplifier according to claim 1, having a substantially flat gain of over a wavelength range extending between 1530 nm and 1610 nm.

11. An optical fiber comprising an erbium doped optical fiber and a plurality of optical filtration elements provided at respective positions along the fiber, wherein the wavelength response of each of the optical filtration elements is selected in dependence on the local gain profile of the optical fiber at the respective position, the fiber having a length of between 25 m and 35 m, and having at least five optical filtration elements along the length of the fiber, the amplifier having a gain ripple of less that 3 dB over a wavelength range extending between 1530 nm and 1590 nm.

12. An optical amplifier as claimed in claim 11, wherein the amplifier has a gain ripple of less than 3 dB over a wavelength range extending between 1530 nm and 1610 nm.

13. An optical amplifier as claimed in claim 11, wherein there are at least ten optical filtration elements.

14. A communications system having an optical fiber coupled between a first and second endstation and a number of optical amplifiers connected to the optical fiber at positions along the cable, each optical amplifier comprising a rare earth doped optical fiber and a plurality of optical filtration elements provided at respective positions along the fiber, wherein the wavelength response of each of the optical filtration elements is selected in dependence on the local gain profile of the optical fiber at the respective position along the fiber, thereby flattening the gain of the amplifier with respect to wavelength over a predetermined bandwidth.

15. An optical amplifier according to claim 1, in which the rare earth doped optical fiber comprises an erbium doped optical fiber.

16. An optical amplifier according to claim 11, in which the rare earth doped optical fiber comprises an erbium doped optical fiber.

17. A communications system according to claim 14, in which the rare earth doped optical fiber comprises an erbium doped optical fiber.

* * * * *